United States Patent [19]
Lee

[11] Patent Number: 6,099,255
[45] Date of Patent: Aug. 8, 2000

[54] FLUID POWER STORAGE DEVICE

[76] Inventor: Wai Cheung Lee, 161 Cedric Avenue, City of York, Toronto, Ontario, Canada, M6C 3X7

[21] Appl. No.: 08/817,817
[22] PCT Filed: Apr. 26, 1996
[86] PCT No.: PCT/CA94/00567
§ 371 Date: Apr. 14, 1997
§ 102(e) Date: Apr. 14, 1997
[87] PCT Pub. No.: WO96/12106
PCT Pub. Date: Apr. 25, 1996
[51] Int. Cl.[7] .................................................. B63H 23/30
[52] U.S. Cl. ................................ 416/169 R; 416/170 R; 416/DIG. 4; 415/123; 415/124.2
[58] Field of Search ........................ 416/169 R, 170 R, 416/DIG. 4; 415/123, 124.2; 74/84 R, 125.5; 192/12 B; 290/1 E, 44, 45, 53, 54

[56] References Cited

U.S. PATENT DOCUMENTS

2,534,411  12/1950  Bright ................................ 416/170 A
4,260,041  4/1981  Mabuchi .............................. 185/40 R
4,524,283  6/1985  Latvus ................................... 290/1 E

*Primary Examiner*—Edward K. Look
*Assistant Examiner*—Ninh Nguyen
*Attorney, Agent, or Firm*—A. M. Fernandez

[57] ABSTRACT

A fluid power storage device is provided in which, the prime mover directly or through a slow-down gear train winds up a spring device having a latch attached therein. The spring device can be a spiral spring or simply a rubber band. When the stored up energy is great enough, an adjustable stopper automatically releases the spring device being latched. The spring device in turn, releases the stored energy which then activates a mechanism or drives an electric generator. After a certain amount of energy stored up is released, the latch will automatically be caught by the stopper. Hence the mechanism or the electric generator will be stopped and the fluid power storage device starts to store up energy again for the next release of the spring device.

19 Claims, 10 Drawing Sheets

FIG.1 ELEVATION PARTLY IN SECTION

FIG.2 PARTIALLY SECTIONED END VIEW E-E

FIG.3 :
PLAN OF FIG.1 & FIG.2

FIG.9 END VIEW

FIG.10 SECTIONAL ELEVATION

FIG.11 SECTIONAL PLAN Q-Q

FIG.12 SECTIONAL PLAN P-P

FLUID POWER STORAGE DEVICE

This invention relates to a storage device capable to store up small fluid power until it is great enough to be useful.

It is common in fluid powered devices to have a mechanism or electric generator being driven by a fan, paddle or float which is moved by a fluid. It is, of course, necessary that the fluid current is strong enough to create necessary force to activate the mechanism or electric generator. Devices like this are, in some cases, impractical because the fluid movement may not be strong enough to activate the mechanism or to drive the electric generator fast enough to generate necessary electricity power.

I have found that this disadvantage may be overcome by adding a gear train having mechanical advantage greater than one between the prime mover and the electric generator so that even smaller fluid movement can cause the fan or paddle to start moving. Output power from the gear train then wind up a spring device or a rubber band, a mechanism automatically release a latch between the spring device (or rubber band) and the electric generator (or mechanism) so that the electric generator or mechanism will be started to move. The latch is then moved to a position clear of meeting the stopper again. This is done by centrifugal force on the swingable latch or on some weights; the swingable latch being swung up after impact on an inclined surface or the latch guided by a circular track to rotate in a different level than the stopper. After a certain amount of energy stored in the spring device or rubber band has been used, the latch will automatically be moved back to its original position by gravitational force or by a small spring to stop movement of the electric generator or mechanism. Then fluid power from the fan, paddle or float can be stored up in the spring device or rubber band again until the energy stored up is great enough to cause another release of the latch. The stopper provided to stop the latch has an adjustable screw so that the amount of energy stored in the spring device before the stopper releases the latch can be adjusted as desired.

The mechanism activated by the spring force released can be used to drive various devices for different desired purposes. In the case that the mechanism is a small hammer striking on pieces of different shapes and materials, some sounds of desired frequencies and pitches can be created.

In the form shown here, the spring device, a rubber band releases its energy to drive an electric generator. The electricity power thus generated can be used for various purposes simply by connecting the output wires from the electric generator to the devices intended to be driven. In the form shown here, the electricity power generated is used to light up some light emitting devices to give out some lights in the fields, gardens or other remote locations. Also the light emitting devices can be installed at any suitable places near to the fan or the electric generator. In the form shown here, some small light bulbs or light emitting diodes are installed behind the fan blades to shine up a transparent flower-shaped cone mounted on the front nose of the fan.

In case that the spring device to be used is a spiral spring, the shaft of the fan or paddle will be connected to a crank rod which then drive a ratchet wheel by a spring pawl mounted on a lever which has one end pivoted on the axis of the ratchet wheel. A pin on the rim of the ratchet wheel is connected to one end of a spiral spring while the other end of the spiral spring is connected to a shaft which extends through the central axis of the Automatic Latch mechanism. The other structures are then the same as in the case when rubber band is used as the spring device. When the prime mover is a paddle or float, they can be linked to the lever having the spring pawl so as to drive the ratchet wheel and store the energy into a spiral spring or rubber band.

Products fabricated using this fluid power storage device can convert wave energy into electricity power for lighting or sending out wireless broadcasting signals to call for help when these devices are connected to wireless broadcasting circuit and being hung onto lifeboats or lifejackets.

In drawings which illustrate embodiments of the invention.

Figure 1:
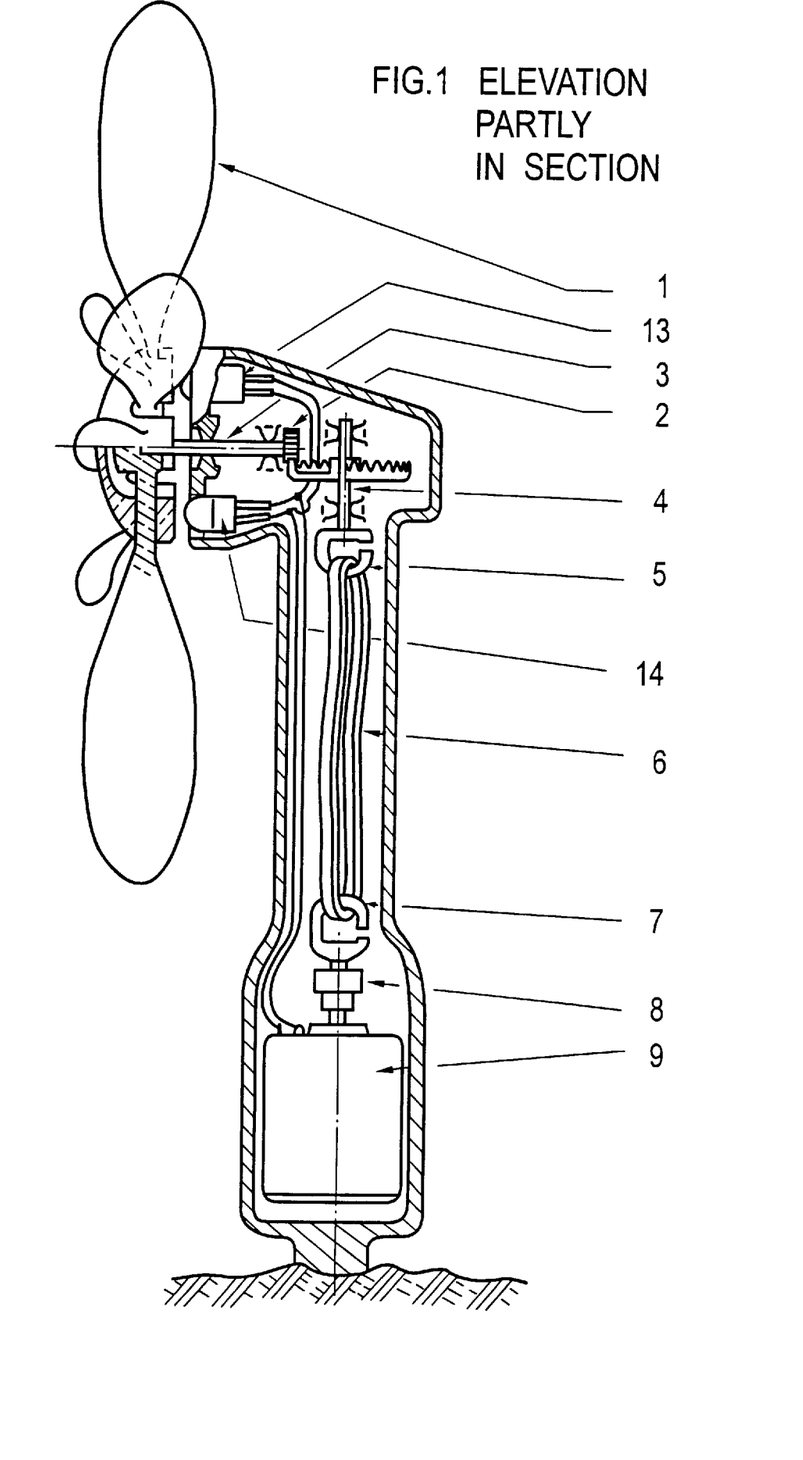
FIG. 1 is an elevation partly in section of one embodiment when the fluid power storage device uses a rubber band for storage of fluid energy from a fan.
Figure 2:
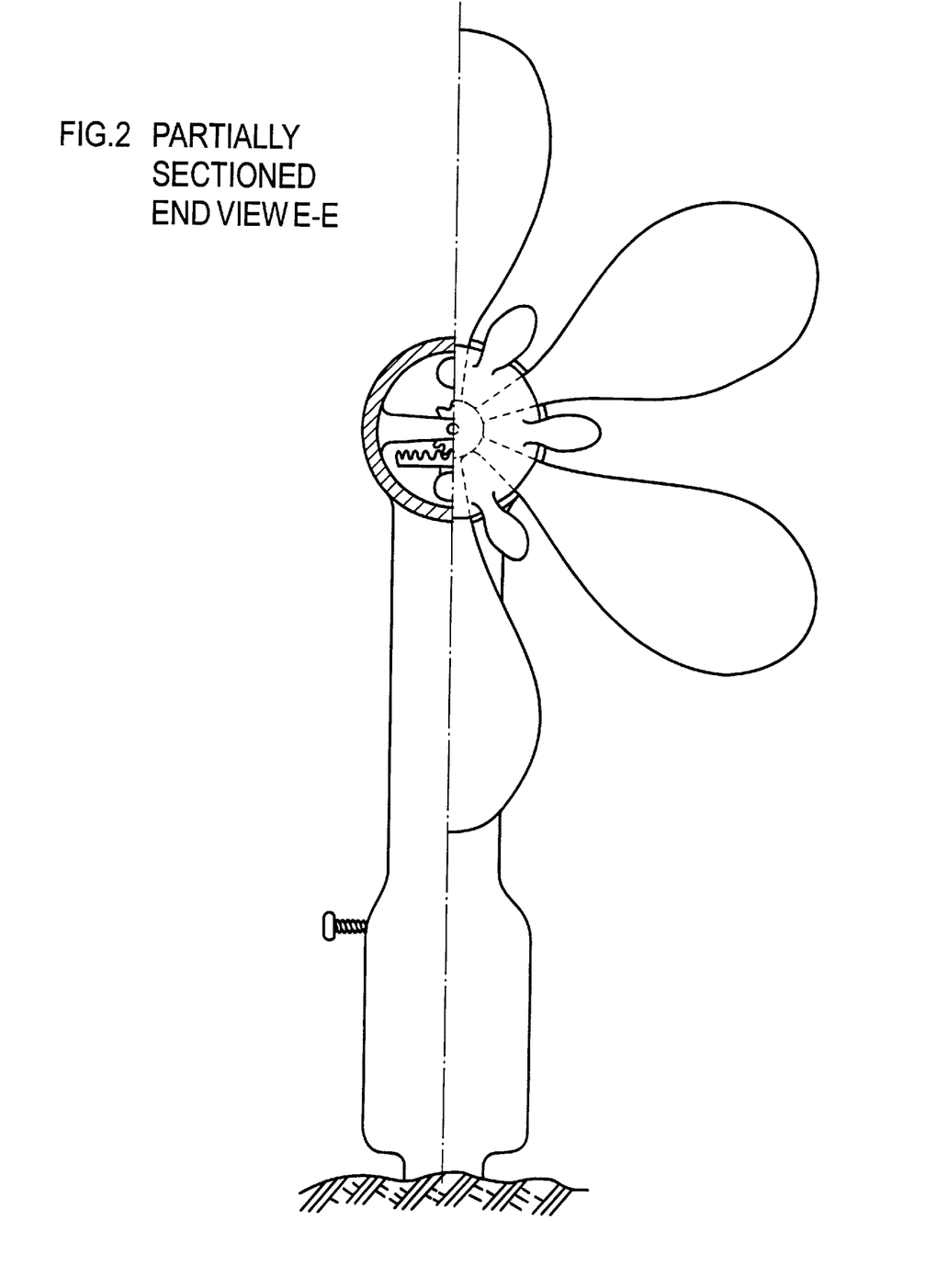
FIG. 2 is a partially sectioned end view looking from the front of the fan to this embodiment and FIG. 3 is a top view of this embodiment.
Figure 3:
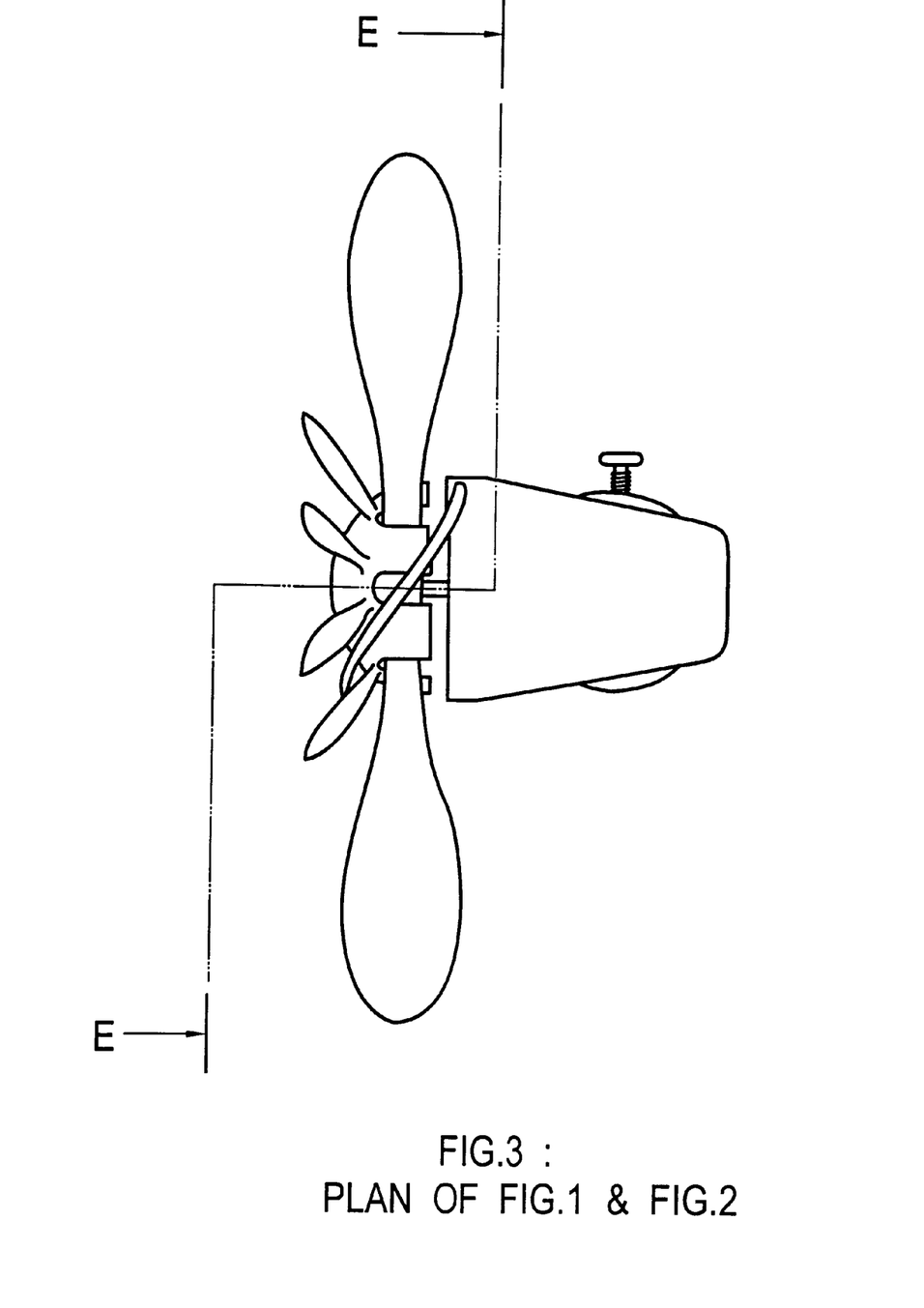
Figure 4:
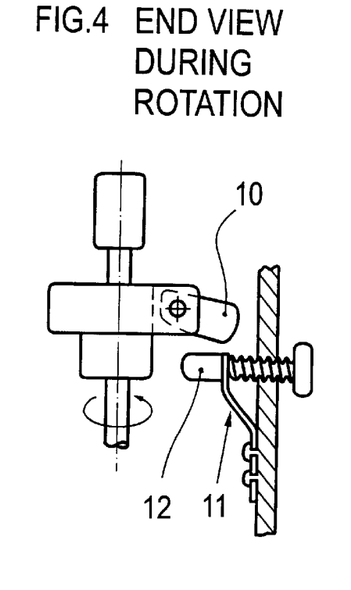
FIGS. 4, 5, 6, 7 & 8 are the elevation, end views, plan and isometric view showing structure of the Automatic Latch mechanism using swingable latch.
Figures 5, 6:
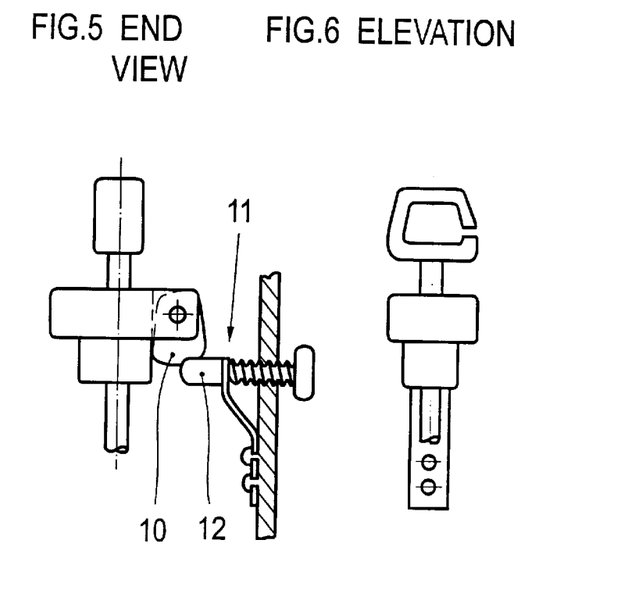
Figure 7:
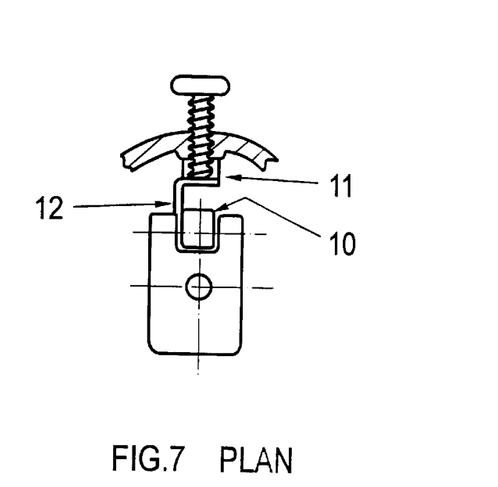
Figure 8:
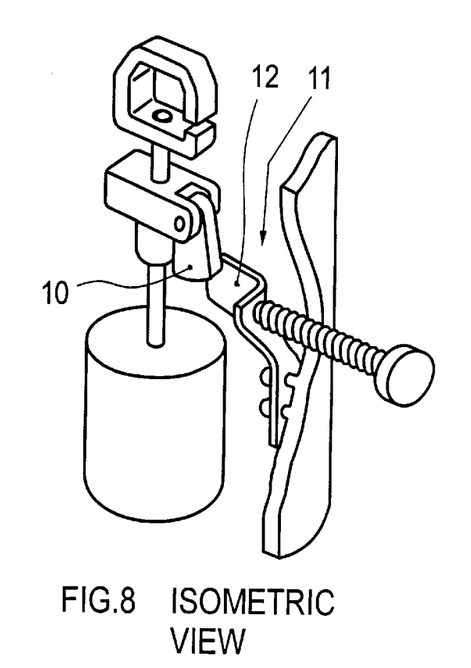
Figure 9:
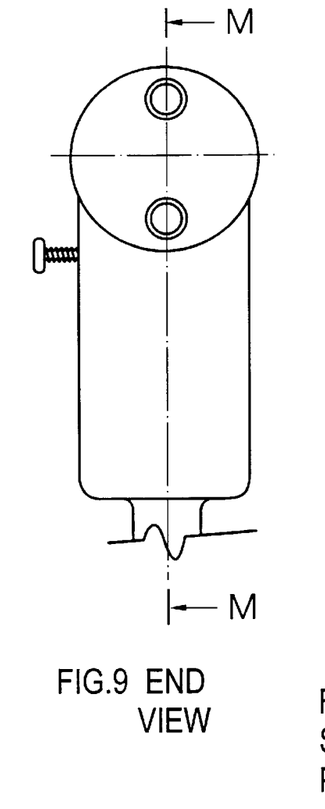
FIGS. 9, 10, 11 & 12 are the end view, sectional elevation and sectional plans of another convertion of the embodiment for storage of a fan's fluid energy into a spiral spring using a ratchet wheel mechanism.
Figure 10:
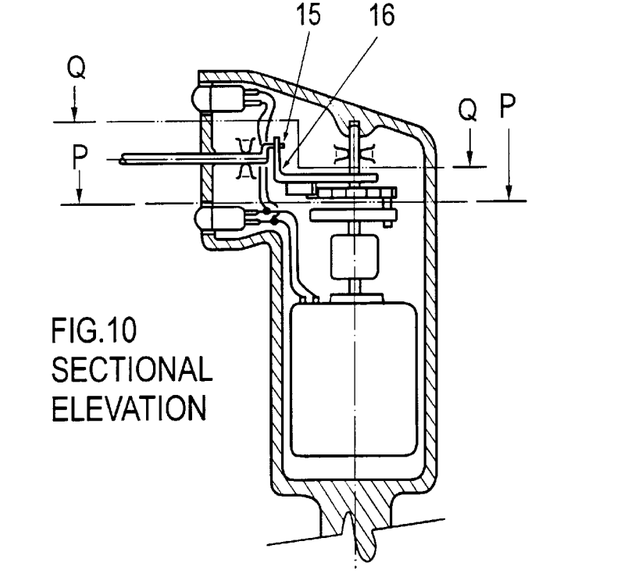
Figure 11:
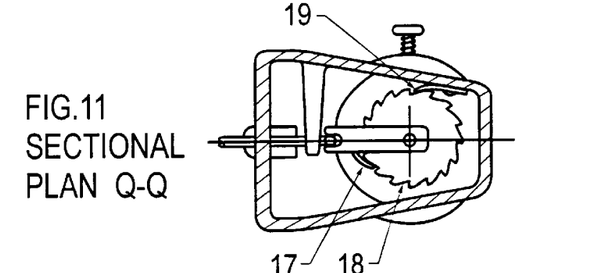
Figure 12:
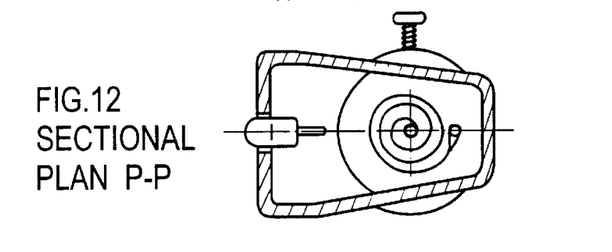
Figure 13:
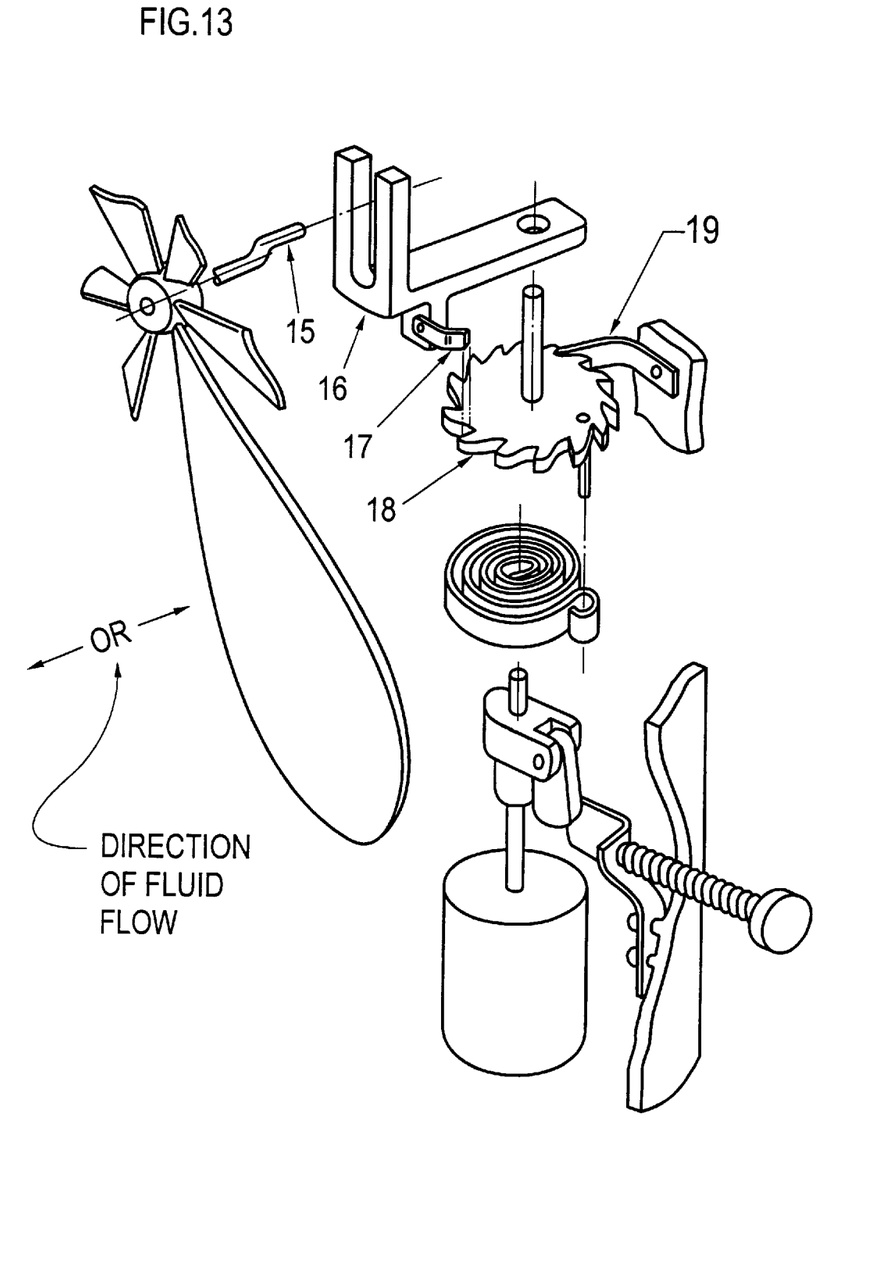
FIG. 13 is an exploded view of the mechanism in FIGS. 9, 10, 11 & 12.

The construction illustrated in FIG. 1 comprises a fan 1 coupling to a gear train. It can be any form of gear train with suitable mechanical advantage larger than one. In the form shown, a spur gear 2 on fan's shaft 3 drives the crown gear on shaft 4 which is then connected to a spring device for storage of the energy. The spring device can be of any suitable material and shape, in the form shown here, is a rubber band 6 hooked on a clip 5 on shaft 4. The other end of the rubber band 6 is hooked on a clip 7 which is connected to the shaft of a small electric generator 9 through an Automatic Latch mechanism 8. As illustrated in FIGS. 4 & 5, the generator is prevented to be driven as a latch 10 is rest against a stopper 11. When the spring device, here the rubber band is winded up tight enough the spring piece 12 of the stopper will be pushed aside by the latch 10 and the energy stored in the spring device will be released to drive the mechanism, in the form shown here, is an electric generator 9 whose output is connected by wires to small light bulbs or light emitting diodes 13 & 14. When the shaft of the generator is started to turn, the latch 10 is swung up by centrifugal force to over-ride the stopper 11. When a certain amount of energy being used up, the speed of the generator will be slowed down, the latch 10 will drop down to a level where it will be stopped by the stopper. The generator will then stop turning until enough energy is stored up in the spring device again for another release of the latch.

In the embodiments shown in FIGS. 9, 10, 11, 12 and 13 which show the convertion of the mechanism when a spiral spring is used as the spring device, the fan's shaft is connected to a crank rod 15 which then drive an arm 16 reciprocately as the crank rod rotates. One end of the arm is pivoted on the central axis of the ratchet wheel 18 and a spring pawl 17 on arm 16 engages the teeth on the ratchet wheel during the forward strokes of pawl 17 and drive the wheel 18 anticlockwisely as looked from the top. A spring pawl 19 engages the teeth of the ratchet wheel during backward strokes of the arm 16 to prevent the wheel 18 from turning clockwisely as looked from tho top. In this arrangement. no matter the fluid flows from the front or from the back of the fan, the wheel 13 still turns in only one direction for tightening up of the spiral spring.

Figure 14:
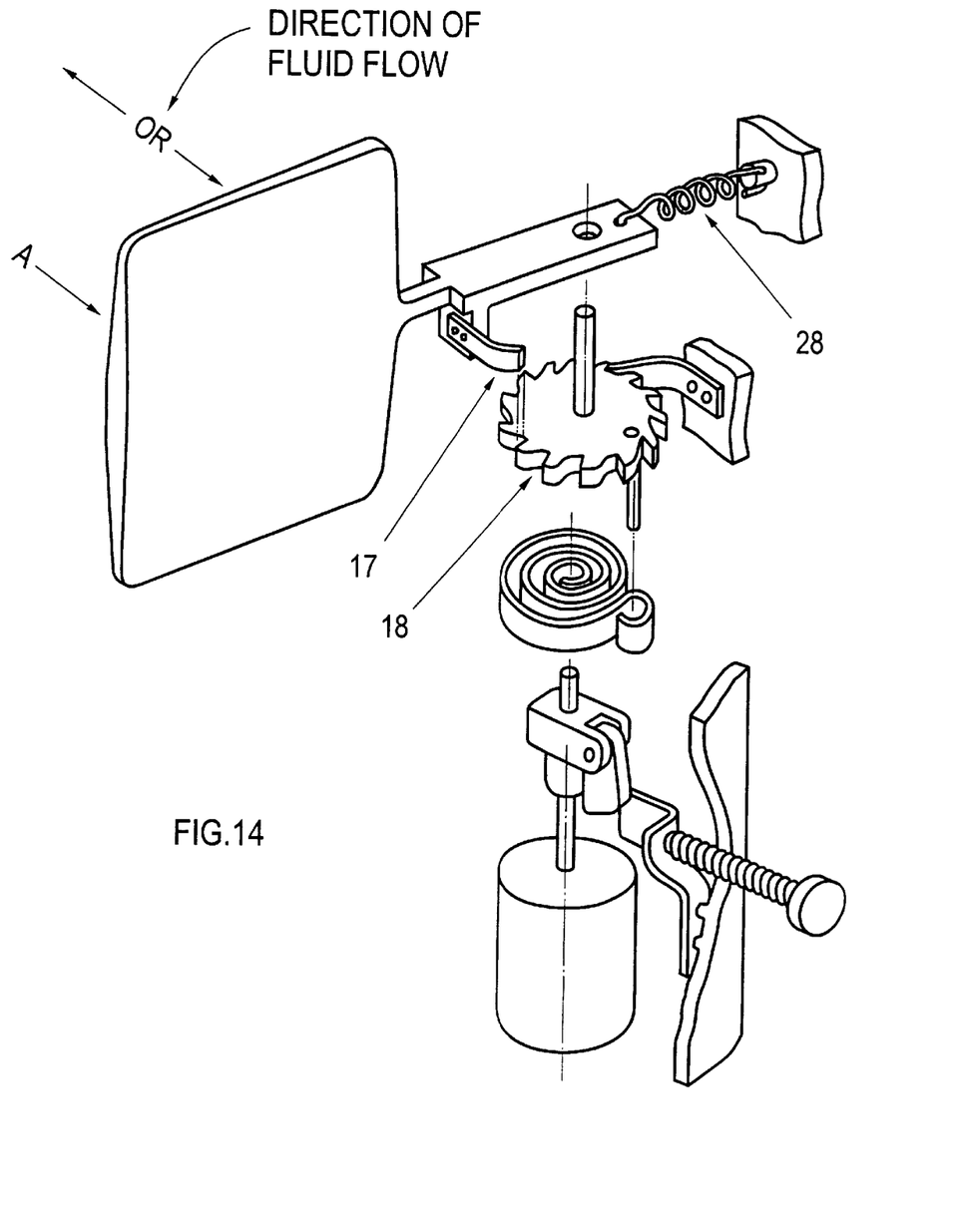
FIG. 14 is an exploded view of a convertion when a spiral spring is used for the storage of energy from a float or paddle.

FIG. 14 shows the convertion of the arm 16 when the prime mover is a paddle or float. When the fluid flow is from direction A as shown in the figure, the spring pawl 17 engages the teeth of the ratchet wheel 18 and turn the wheel 18 anticlockwisely as looked from the top. When the fluid flow becomes weaker, the tension spring 28 will return the paddle to its original position. All the other structures are then the same as in FIG. 13.

Figures 15, 24:
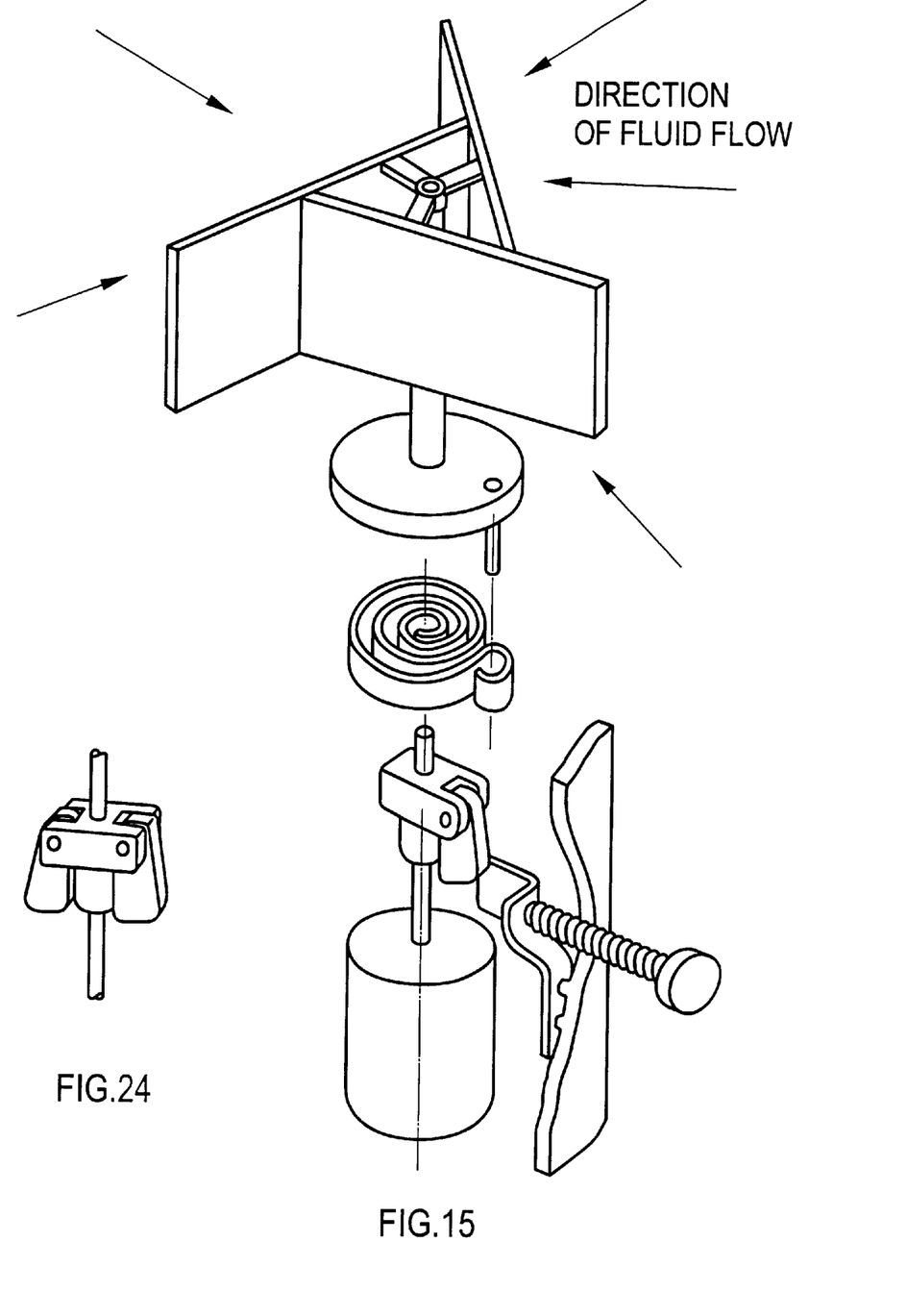
FIG. 15 is an exploded view of a convertion when a spiral spring is used for the storage of fluid energy from a paddle fan.
FIG. 24 show the isometric view of an Automatic Latch mechanism using two swingable latches rather-than one swingable latch.

FIG. 15 shows the mechanism when the prime mover is a paddle fan. Due to its structure as shown, regardless of the direction of the fluid flows, the paddle fan will only be rotating in anticlockwise direction as looked from the top by the energy of the fluid flow. So the spiral spring can be kept on tightening for storing up of the fluid energy.

Figure 16:
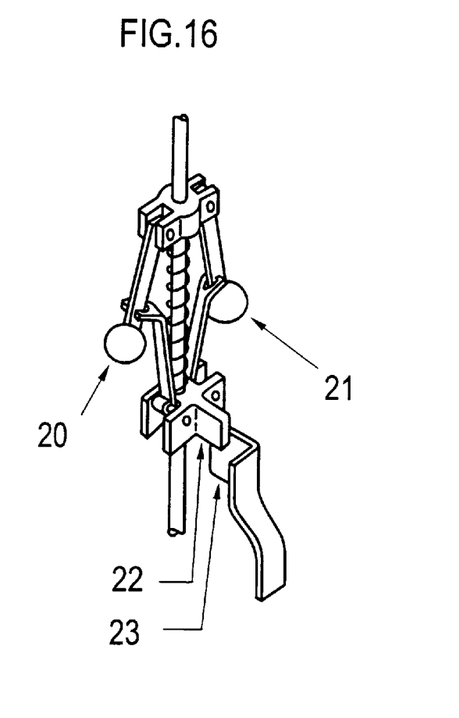
FIGS. 16 & 17 show the isometric views of another Automatic Latch using two weights during rest condition and during rotation.
Figure 17:
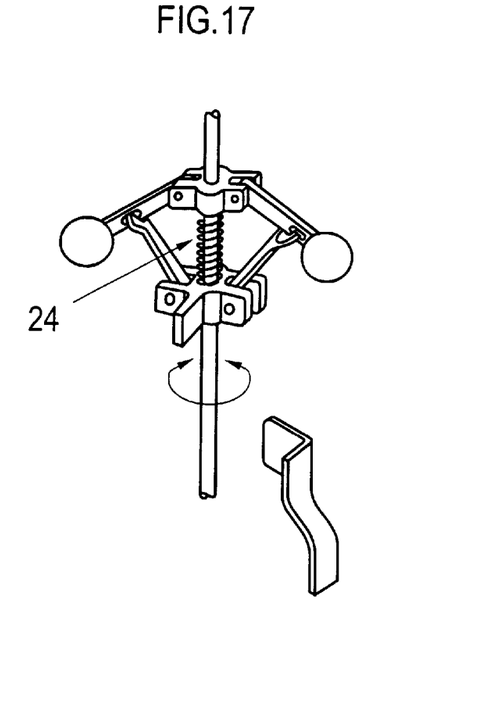

FIG. 16 shows an Automatic Latch mechanism using two weights 20 & 21 at its rest condition when the latch 22 is against the stopper 23. When the spring device is tightened enough, the latch will press aside the stopper and the shaft started to rotate, the centrifugal force acting on the two weights then pull the latch up to a level where it is clear for touching the stopper again. After a certain amount of energy in the spring device has been released, the rotation speed of the shaft is lowered, so the latch will move back to its original level and be stopped by the stopper again due to the two weights being pulled down by the gravitational force or by the force of the spring 24. FIG. 17 shows the latch mechanism during rotation.

Figure 18:
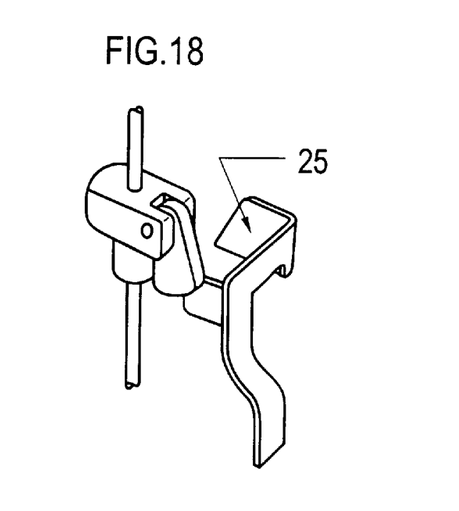
FIGS. 18 & 19 show the isometric views of another Automatic Latch with the swingable latch being swung up by the impact force on an inclined surface.
Figure 19:
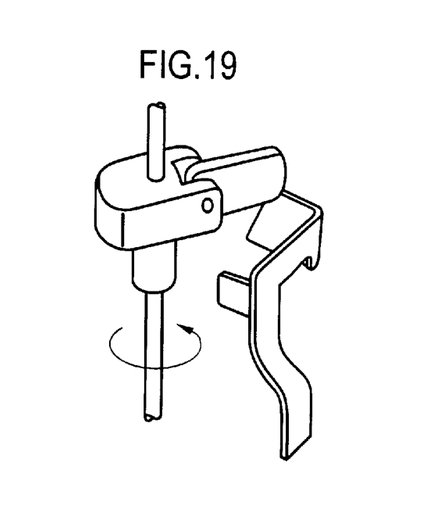

In FIG. 18, a swingable latch is being stopped by a stopper. FIG. 19 shows that after the spring device is tightened enough and the stopper releases the latch, the shaft will be started to rotate. The latch will be swung up after impact on an inclined surface 25. Before the latch drop down to be stopped by the stopper, the shaft is able to make a certain number of rotation.

Figure 20:
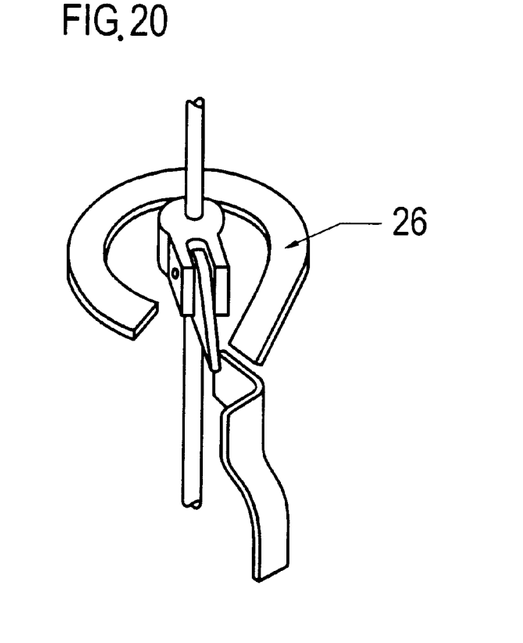
FIGS. 20 & 21 show the isometric views of another Automatic Latch with a swingable latch and a circular track during rest condition and during rotation.
Figure 21:
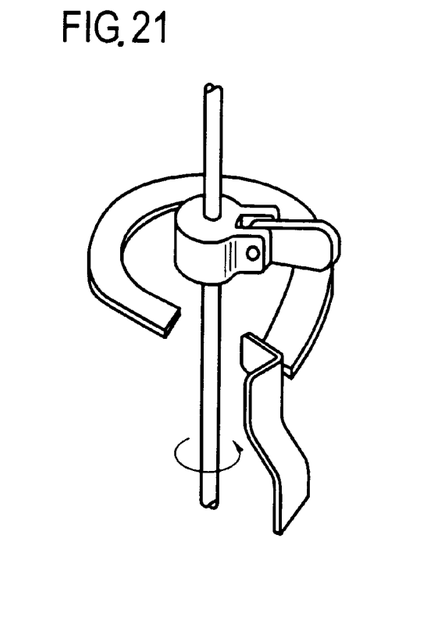

In FIG. 20, a swingable latch is stopped by a stopper. FIG. 21 shows that after the stopper releases the latch and the shaft started to rotate, the swingable latch will be guided by a circular track 26 to rotate in a different level than the stopper. During end of each revolution, if the shaft speed is still high enough, the latch can jump over the gap and be guided by the track again. But if the shaft's speed is slow, then the latch will swing down and falls into the gap and be stopped by the stopper.

Figure 22:
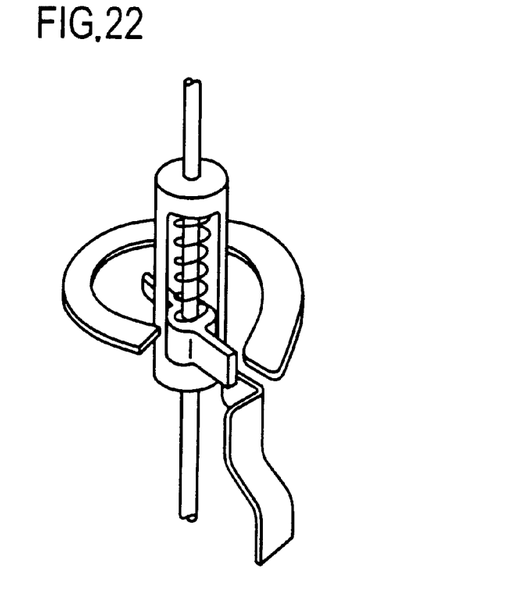
FIGS. 22 & 23 show the isometric views of another Automatic Latch with a straight latch and a circular track during rest condition and during rotation.

FIG. 22 shows a similar structure when a straight latch is being stopped by the stopper.

Figure 23:
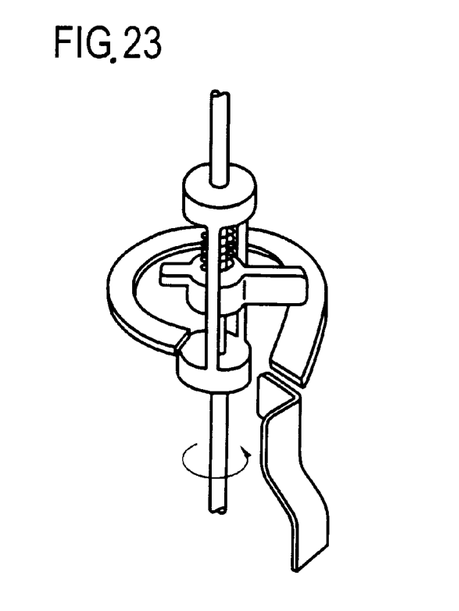

FIG. 23 shows that after the stopper releases the latch and the shaft started to rotate, the straight latch is guided by a circular track to rotate in a different level than the stopper. During end of each revolution, if the shaft speed is still high enough, the straight latch can jump over the gap and be guided by the track again. But if the shaft's speed become low, the straight latch will not be able to jump over the gap but drop down to a level by a small spring and be stopped by the stopper again.

FIG. 24 shows an Automatic Latch that has two swingable latches rather than just one swingable latch. This enable the shaft to rotate more stably since the centrifugal forces on the two swingable latches balance each other during rotation of the shaft. The other functions are the same as the Automatic Latch with just one swingable latch.

I claim:

1. A fluid power storage system capable of storing small amounts of fluid energy of nature that acts against a prime mover, said energy being stored in a torsional device coupled at one end thereof to the output end of a motion transmission mechanism powered by said prime mover, the other end of said device being connected to a shaft of an output load, said torsional device comprising at least one of a helical spring, a flat spiral spring, and a rubber band, being forced to wind from an initial state by said motion transmission mechanism in response to said fluid energy even while it varies unpredictably in magnitude of force acting against said prime mover, all of this system being supported by a rigid support structure that holds said prime mover and motion transmission mechanism in a fixed spatial relationship with respect to said shaft of said load, characterized by:

a latch mechanism connected to said shaft of said load for preventing rotation of said shaft until said device has accumulated within its storage capacity a certain amount of energy set by said latch mechanism sufficient to rotate said shaft to produce useful work from said load, said latch mechanism comprising:

a latch attached to said shaft, and a stopper held in a fixed position relative to said shaft by said rigid support structure to engage said latch, thereby to prevent said shaft from rotating until said torsional device has stored the aforesaid certain amount of energy which is sufficient for said latch to override said stopper, whereupon said shaft is rotated by energy stored in said torsional device while said latch is held clear of said stopper until energy stored in said device is expended sufficiently to cause said shaft rotation to slow down and permit said latch to return to its position parallel to said shaft under the influence of a force so that said latch will again engage said stopper and said torsional device may begin storing energy again.

2. A fluid power storage system as defined in claim 1 wherein said latch is a pivotal latch attached at a fixed point to said shaft by a pivot pin perpendicular to said shaft, said latch being normally retained parallel to said shaft by said force to engage said stopper until torsional force of said device overrides said stopper, whereupon said small force is overcome by centrifugal force once said shaft begins to rotate, thereby maintaining said latch clear of said stopper until substantial stored energy is expended, whereupon the aforesaid centrifugal force diminishes to the point where said pivotal latch again engages said stopper and said prime mover again begins to store energy in said torsional device.

3. A fluid power storage system as in claim 1 wherein said latch (10) is a rigid latch (22) secured to said shaft of said load by a collar that may slide back and forth on said shaft between limits against the force of a compression spring, one limit being with said compression spring not being compressed against a back stop fixed on said shaft and the other with said compression spring fully compressed.

4. A fluid power storage system as defined in claim 2 wherein said stopper comprises a spring piece that may be sprung out of the way of said pivotal latch as the torsional force stored in said device becomes sufficient to push it aside.

5. A fluid power storage system as defined in claim 4 including an inclined surface (25) on the far side thereof with respect to said pivotal latch to force said pivotal latch to a position perpendicular to the axis of said shaft immediately after said latch overrides said stopper.

6. A fluid power storage system as defined in claim 5 including as an extension of said inclined surface a circular track in a plane perpendicular to the axis of said shaft, said track being about three quarters of a circle from the end of said inclined surface to a point substantially short of the position of said stopper.

7. A fluid power storage system as defined in claim 6 including a set screw for setting the extent to which said spring piece protrudes in the path of said pivotal latch while said shaft of said load is not turning.

8. A fluid power storage system as defined in claim 3 wherein said one limit that said collar may slide with said spring not being compressed against said fixed back stop is set by a limit stop attached to said back stop by two spacing bars on diametrically opposite sides of said shaft.

9. A fluid power storage system as defined in claim 8 wherein said stopper comprises a spring piece that may be sprung out of the way of said rigid latch as the torsional force stored in said device becomes sufficient to push it aside.

10. A fluid power storage system as defined in claim 9 including an inclined surface (25) on the far side thereof with respect to said pivotal latch to force said pivotal latch to a position perpendicular to the axis of said shaft immediately after said latch overrides said stopper.

11. A fluid power storage system as defined in claim 10 including as an extension of said inclined surface a circular track in a plane perpendicular to the axis of said shaft, said track being about three quarters of a circle from the end of said inclined surface to a point substantially short of the position of said stopper.

12. A fluid power storage system as defined in claim 11 including a set screw for setting the extent to which said spring piece in the path of said pivotal latch (10) while said shaft of said load (9) is not turning.

13. A fluid power storage system as defined in claim 3 wherein the one limit that said collar may slide with said spring not being compressed against said fixed back stop comprises linkages on diametrically opposite sides of said shaft connecting said collar to said back stop, each linkage consisting of two links, each link having one end pivotally connected to the other link, one link having its other end pivotally connected to said collar and the link having its other end pivotally connected to said back stop, and two equal weights, one weight connected to the pivotal point between two links, whereby centrifugal force produced by said weights once said latch overruns said stopper will lift said latch well clear of said stopper.

14. A fluid power storage system as defined in claim 13 wherein said stopper comprises a spring piece that may be sprung out of the way of said rigid latch as the torsional force stored in said device becomes sufficient to push it aside.

15. A fluid power storage system as defined in claim 14 including a set screw for setting the extent to which said spring piece in the path of said rigid latch while said shaft of said load is not turning.

16. A fluid power storage system as defined in claim 2 or 3 wherein said torsional device is a flat spiral spring having its inner end connected to said shaft of said load and its outer end connected to said motion transmission system, and said motion transmission system comprises a ratchet wheel (18) which turns on a shaft.

17. A fluid power storage system as defined in claim 16 wherein said prime mover is a fan and said motion transmission system comprises a crank (15) connected to a hub of said fan and a reciprocating arm (16) driven by said crank as it is rotated by said fan, said reciprocating arm being pivoted on said shaft of said ratchet wheel, said reciprocating arm having a spring pawl (17) engaging teeth of said ratchet wheel to drive said ratchet wheel in one direction as said crank is rotated by said fan, and a spring pawl (19) affixed to said rigid support structure and oriented to engage said teeth of said ratchet wheel to prevent said ratchet wheel from rotating in a reverse direction.

18. A fluid power storage system as defined in claim 16 wherein said prime mover is an object attached to one end of an arm pivoted on said shaft of said ratchet wheel (18) so that it is moved in one direction by fluid flow and returned by a spring connected between the other end of said arm and said rigid support structure, said arm having at said one end a spring pawl (17) engaging teeth of said ratchet wheel to drive said ratchet wheel in one direction as said arm is pivoted on said ratchet wheel shaft in said one direction by said object, and a spring pawl affixed to said rigid support structure and oriented to engage said teeth of said ratchet wheel to prevent said ratchet wheel from rotating in a reverse direction as said arm is returned by said spring connected between said arm and said rigid support structure.

19. A fluid power storage system as defined in claim 16 wherein said prime mover is a paddle fan having a shaft which turns on an axis in line with the axis of said load shaft and said motion transmission system comprises a crank having its driven end connected to said outer end of said flat spiral spring.

\* \* \* \* \*